Dec. 8, 1964

C. O. SCOTT 3,160,372

AIRCRAFT SAFETY DOOR

Filed July 12, 1963

INVENTOR.
CLIFFORD O. SCOTT

BY *[signature]*

ATTORNEY

Dec. 8, 1964 C. O. SCOTT 3,160,372
AIRCRAFT SAFETY DOOR
Filed July 12, 1963 2 Sheets-Sheet 2

INVENTOR.
CLIFFORD O. SCOTT
BY
ATTORNEY

United States Patent Office 3,160,372
Patented Dec. 8, 1964

3,160,372
AIRCRAFT SAFETY DOOR
Clifford O. Scott, 4015 Kittyhawk Drive, Dayton, Ohio
Filed July 12, 1963, Ser. No. 294,772
5 Claims. (Cl. 244—129)
(Granted under Title 35, U.S. Code (1952), sec. 266)

The invention described herein may be manufactured and used by or for the Government for governmental purposes without the payment to me of any royalty thereon.

The present invention relates to improvements in body construciton for vehicles and is particularly directed to a novel door and window for aircraft fuselage bodies and means for operating it. This is an improvement on and a new adaptation of Patent No. 2,622,919 dated 23, 1952.

At the present time the entrance and exit openings for many conventional aircraft, helicopters and the like are closed by hinged doors that cannot be opened easily to exit from the body in flight, or enter or exit the body while parked on the ramp with the engines running, due to the airstream tending to hold the doors closed. Under current construction on many aircraft, it is also not possible to open a window for ventilation or the taking of pictures, etc.

It is therefore an object of this invention to provide an improved method of body construction for increased safety, greater comfort, faster and easier entrance and exit of the cabin, etc., through provision of a door which is guided for movement within the confines of the body when it is moved from its open or closed position relative to the entrance and exit opening in said body.

Another objective is to provide in an aircraft body having the foregoing characteristics a single manually operated mechanism for actuating the movable parts of the structure, said mechanism having a manipulating device which is accessible either interiorly or exteriorly of the body.

Another object of the invention is to provide in an aircraft body a door which may be moved edgewise beneath or above the door opening in the body to an open inoperative position for entrance to and exit from the interior of the body.

A further object of the invention is to provide an aircraft body with a suitable hangar or door storing space positioned beneath the floor or overhead in the cabin of the body subadjacent the door opening and which is arranged to support the door whenever it is desirable to enter or leave the body.

Another objective is to provide for automatic jettison or ejection of the complete door assembly from the aircraft body upon collision or impending disaster such as fire, etc. by instant release of one or both sides of retaining slides for the door from the body by means of quick release retainers, shearing of retaining bolts, pins, or the like, that fasten the retaining slides that hold the door in a closed position.

Another object of the invention is to provide an operating means for a door of the character described which automatically moves the window or upper portion of door within the door proper or lower section, prior to movement of the door to its inoperative open position for exit from the body and which also returns the door to closed position and moves the window from the door to its extended, closed position within the door opening. The invention also contemplates the provision of a simplified control for the door and window operating mechanism which may be readily set in a selected position so that upon return of the door to closed position the parts will assume their respective preselected position.

A further object of the invention is to provide means for manually opening of the window while the door is in a closed position for ventilation, especially while the aircraft is on the ground and for clearer vision when aloft for taking pictures, etc.

Further objects of the invention are to provide for a door of the character described, a means whereby its upper section is movable bodily into and enclosed by the lower section so that the door, so collapsed, may readily be moved to an open, inoperative position; to provide a door construction that can be made without the use of expensive door panel dies and their presses thereby facilitating body construction and materially reducing weight and manufacturing costs.

Another object of the invention is to provide a means for tracking a door of almost any outer configuration to and from the hanger for the door by separate tracks for guiding and holding the door instead of dependence on the inner and outer skin for guidance as an alternate method of construction.

A further object is to provide a means for guiding a door by means of a channel guide or the like, for the front and rear edge of a door to guide a door into and out of the hanger in the fuselage body by suspension in the guiding tracks at two or more places in such a manner as to allow conformance with outer configuration when the door is closed.

Another object of the invention is to provide the means for flexing a light weight door without end plates; consisting of only the inner and outer panel, by reduction of contact area of the door in the guides to a minimum thereby allowing this invention to be used on aircraft of practically all fuselage body configurations.

The accomplishment of these objectives will also be conducive to the prevention of accidents, saving of lives, more comfortable operation, easier entrance and exit, wider usage of the aircraft, enable a jump to be made from aircraft by parachute, etc.

These and other objects will be apparent from the following specification and accompanying drawings wherein.

Figure 1:
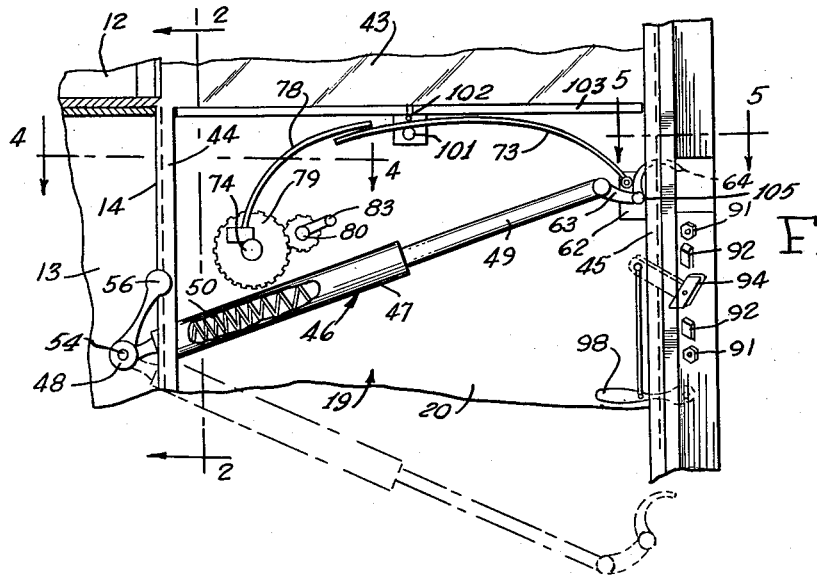
FIG. 1 is a fragmental, side elevational view of a closed aircraft fuselage body illustrating the preferred embodiment of my invention, and wherein the door is shown in its closed, operative position, some parts being broken away.

In the drawings the numeral 12 indicates a closed aircraft fuselage body having vertically curved side walls. One or both of the side walls may be provided with one or a plurality of openings 14 for entrance into or exit from the interior of the fuselage body. As most clearly illustrated in FIGS. 2 and 4 the fuselage has a vertically curved outer body plate 15 and vertically curved inner body plate 16 which may be spaced apart adjacent the forward vertical edge of the opening 14 by a body post in the form of a vertically disposed channel 17. The rearward edges of the outer and inner body plates defining the opening 14 may be spaced apart by a channel 18.

Figures 4, 5:
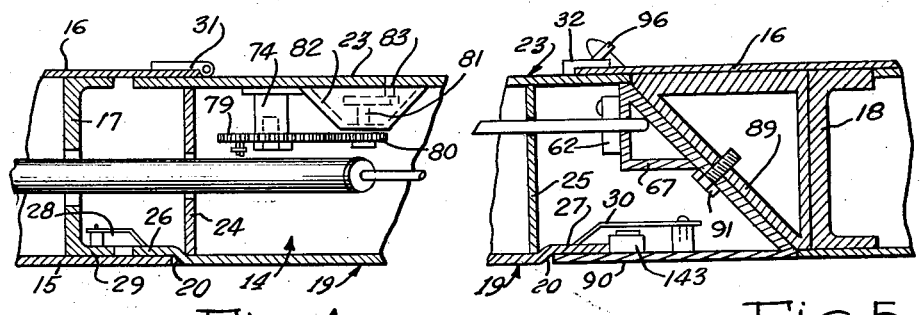
FIG. 4 is a section taken on line 4—4 of FIG. 1.
FIG. 5 is an enlarged section taken on line 5—5 of FIG. 1.
Figure 6:
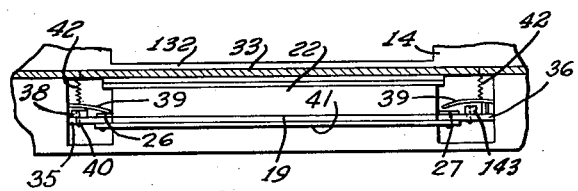
FIG. 6 is an enlarged section taken on line 6—6 of FIG. 2.
Figure 2:
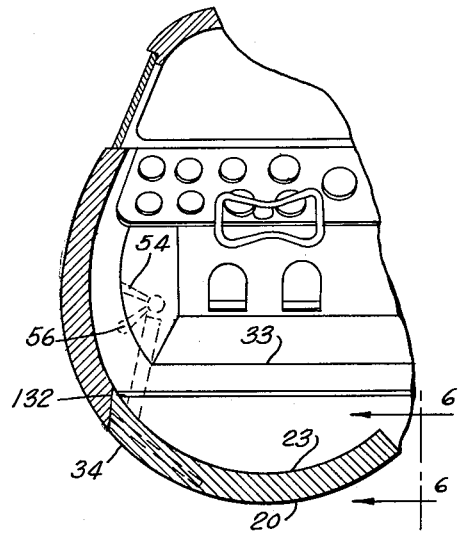
FIG. 2 is a section taken on line 2—2 of FIG. 1 showing the aircraft fuselage body door in open, inoperative position beneath the body.
Figure 3:
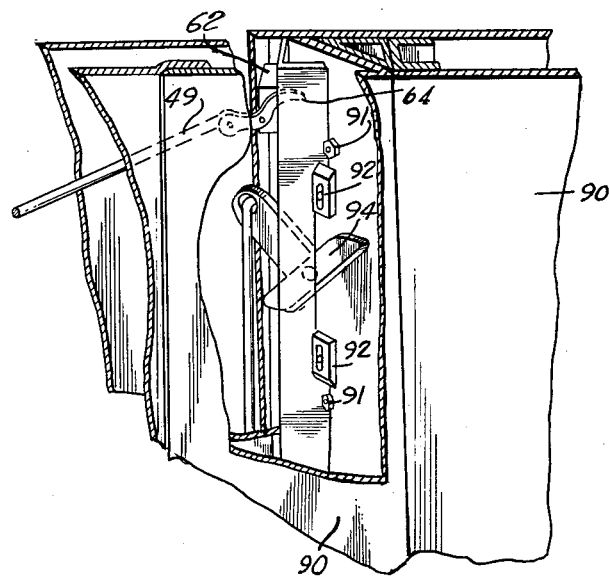
FIG. 3 is an enlarged, fragmentary detail of the door ejection mechanism as it is illustrated in FIG. 1.

A door 19 is normally adapted to close the opening 14 in the body and as illustrated in FIG. 2 the door is transversely curved or otherwise shaped to conform to, and normally close the lower portion of the body opening. This door has an outer panel 20 which may be provided with internal upper and lower flanges 21 and 22 which may have either or both of their inner ends extended to form a juncture with an inner panel 23. To provide greater rigidity for the door a pair of spaced side plates 24 and 25 may extend between the outer and inner panels and be welded thereto as illustrated in FIGS. 4 and 5 of the drawings. The forward and rearward edges of outer panel 20 are inset from the major surface of said panel and are bent to form guide flanges 26 and 27 for receiving the adjacent edge of the outer body plate 15 on the forward side and on outer plate 90 at the rear side of the door opening. The inner body plate 16 extends beyond the inner edges of the inner flanges of the channels 17 and 18 to form an overlapping interior seal for the door; the extending edges of the outer and inner body plates forming with the channels a curved door guide in the vertical edges of the body defining the opening therein. Roller 96 rides along sealing strip 32.

The space between the forward edge of the outer body plate 15 describing the opening 14 and the guide flange 26 is sealed by a weather strip 28 which has one end secured by rivets, or the like, to a flange 29 of the channel 17 and has its free end in resilient engagement with the inner surface of the guide flange 26. The sliding connection between the rearward guide flange 27 and the plate 90 is sealed by a weather strip 30 (FIG. 5), which is fastened as by rivets to plate 90 and has its free end in flexible engagement with the said guide. The inner body plate 16 carries sealing strips 31 and 32 along the forward and rearward vertical edges respectively of the body opening and a sealing strip 132 is carried along the outer edge of a floor 33 for precluding the entrance into the interior of the body of drafts that happen to pass through the exterior seals between the opening and the door, or from beneath the fuselage body. It is contemplated that the upper part of the door may have a smaller overall thickness than the lower part thereof so that when the door is slid into its operative position closing the opening, the vertical edges thereof will be wedged into tight fitting relationship with the vertical guides and with the weather strips and sealing strips secured thereto.

The door is slidable bottomwise beneath the floor 33 of the body into a curved hanger indicated in the drawings by the reference numeral 34. This hanger has a pair of spaced tracks 35 and 36 for receiving the door guides 26 and 27 respectively. The tracks 35 and 36 are a continuation or an extension of the respective vertical guides for 26 and 27 of the door opening 14. A spacer 38 is disposed along the outer edge of the track 35 and carries on its upper surface a suitable sealing strip 39, said strips and the spacer being joined together throughout their lengths by any suitable fastening means such as rivets 40. In order that the tracks 35 and 36 may be held in fixed spaced relation, one with the other, the inner ends may be joined by a cross bar 41.

Variations of design can be had by the elimination of portions of guide flanges 26 and 27 on the doors allowing the center portion to conform to almost any conceivable lines the designer might care to use without departing from the spirit of this invention; it also being conceivable that in the interest of economy a manufacturer might care to delete the end flanges 21 and 22 allowing the upper or lower edges of the door to flex or otherwise follow body lines not arcuately a true curve. In this case the inner panel would have to be allowed a slight vertical movement at one end, a result not dissimilar to a book of paper matches with the covers being the inner and outer panels.

It is conceivable that for extreme simplicity of construction, the door fabricated without end flanges and weather strips can be floated between inner body plate 16 and outer plate 15 against the series of rollers 143 at the rear edge of the door. Outer skin of door panel 20 would suffice without inset of front and rear edges for guidance, where a set back of outer plate thickness for the door is immaterial.

A window 43 is adapted to normally close the upper portion of the body opening and is slidable edgewise into the upper part of the door on a pair of spaced vertical tracks 44 and 45 mounted within the confines of the door. It will therefore be noted that the door 20 is adapted to normally close the lower portion of the opening 14 and that the window 43, slidable within the upper part of the door, is adapted to normally close the portion of the door opening between the upper edge of the door and the upper extremity of said door opening. Because of the curved contour of the body and the conformation of the door to the body contour, the door may be moved downwardly into the curved hanger 34 disposed beneath the floor of the body for the purpose of entrance or exit from the body interior.

With reference to FIG. 1 and FIG. 5, it will be noted that the door actuating mechanism is disposed to one side of the door and within the confines of the body. To provide free sliding action for the door a series of rollers 143 are positioned adjacent the rearward edge of the body opening and as indicated in FIG. 5 may be journaled on shafts secured to the interior face of the jettisonable V-shaped outer plate 90 fastened to the rigid, angularly disposed door post 89. The outer plate 90 is fastened to the rigid post 89 near the center by soft screws, pins, rivets or the like 91 and quickly jettisoned by severing the screws or the like 91 manually by lowering handle 98 rotating lever 94 which extends knives 92 to complete severance of screws or alternative fasteners. Pressure against rollers 143 resulting from impact on the front of the airplane would also automatically sever screws 91 in case of a collision by shearing action of outer plate 90 sliding across angularly disposed door post 89 and jettison the complete door along with the outer plate 90. The series of rollers is continued across the hanger track 36 and it will be noted that the door is continuously urged rearwardly by the door actuating mechanism so that the edge of the guide flange 27 of the door bears against and has almost frictionless contact with the series of rollers during operation of the door by the mechanism. The door actuating mechanism consists of a spring loaded extensible arm 46 pivotally mounted for oscillating movement on the body and which functions in opening and closing the door like a load and fire mechanism.

A load and fire mechanism consists of a tube, closed at one end and holding a coil spring inside, a plunger pressed into its open end against the spring causing continuous pressure to be exerted on the plunger which would fire the plunger outward, as a projectile, if all withholding action is removed. The arm comprises a tubular member 47 mounted at one end to the body upon a universal ball and socket joint 48 and having movable in its opposed end a plunger 49 which is urged outwardly by a compression spring 50 positioned within the tubular member. The shaft 54 which freely passes through the body has fixed to its outer end a handle 55 whilst its inner end has fixed thereto a handle 56.

The window 43 is supported upon an arm 73 fastened to latch sliding block 62. Arm 73 passes between rollers 101 and 102 mounted on window support 103. Sliding block 62 is slidably mounted on member 67 and pivotally connected to latch arm 63 by means of pin 105. Window 43 is lowered when the door 23 is lowered because as latch arm 63 snaps past center pulling out locking pin 64, it also lowers latch sliding block 62 and spring 73 which in turn pulls window 43 down into position within the door. Therefore whenever the door is lowered into its open position the window will automatically be withdrawn to a position between the panels of the door. Similarly, upon closing the door, the window 43 will be closed because as locking pin 64 falls into the locking hole in member 67, which is mounted on V-shaped outer plate 90, it will snap past center in the opposite direction causing the spring 73 to raise window 43. The window is raised or lowered in the usual manner by a window regulator which comprises a gear 79 rotating on shaft 74 which meshes with a gear 80 mounted on a shaft 81 in turn rotatably mounted in an inset portion 82 formed in the inner panel 23. The inset portion is preferably round and has disposed therein a handle 83 which is fixed to the shaft 81. The handle 83 is thereby disposed within the confines of the door panel 23 so that when said door slides beneath the body said handle will clear the edge of the floor adjacent the door opening. Rotation of handle 83 causes flexible arm 78 to bear on flexible arm 73 to lower window 43 into lower portion of door 23 for ventilation or better vision.

In operation it will be noted that the window may be raised or lowered to a selected position by operating the window regulator. To do this the handle 83 is grasped and turned either clockwise or counterclockwise until the arm 78 has been pivoted to a position to allow support of the window in the position selected by the operator.

When it is desired to open the door either from the inside or the outside the handles 55 and/or 56 respectively may be grasped and turned thereby rotating the extensible arm about its pivotal mounting 48.

To close the door either handle 55 or 56 is grasped and rotated in the opposite direction whereby the door will rise into the opening and as it assumes its normal closed position further rotation of the handle will cause the latch to engage the latch arm 64 on movable block 62 and then be moved by the extensible arm into the position illustrated in FIG. 1.

I claim:
1. In an aircraft body:
   (a) A door having mutually spaced inner and outer panels and slidable from a position normally closing an opening in the aircraft body to a position within a storage space in the aircraft body beneath said opening;
   (b) A curved track on each side of said opening to guide the movement of said door, one of said guide tracks being attached to the aircraft body through severable fastening means which will release the door for jettison upon the impact of a collision;
   (c) An over center spring loaded extensible arm pivotally mounted to one side of the opening in said aircraft and having its opposite end mounted on said door through a pivotal locking mechanism within said door; and
   (d) A spring arm on the pivotal locking mechanism capable of lowering a window within said door upon opening said door.
2. An aircraft including:
   (a) A body having an opening formed through at least one of its vertically curved side walls for entrance to and exit from the interior of said body;
   (b) A door closing the opening and slidable to a position within the body;
   (c) An extensible arm pivotally mounted on the aircraft to one side of said opening and having a pivotal latch means at its opposite end;
   (d) A guide track at the front and rear of said opening in the aircraft, the rear track being mounted to the aircraft in an angular manner with shearable fastening means;
   (e) An extensible arm leaf spring connecting a window within the door to the end of said extensible arm at the end having the pivotal locking mechanism; and
   (f) A window crank leaf spring connected through gearing to a window crank, said leaf spring coacting with the extensible arm leaf spring to open and close said window with the door in its closed position.
3. An aircraft as claimed in claim 2 wherein the shearing means comprises:
   (a) A pair of spaced shearable fasteners;
   (b) A slidable knife adjacent to each of said fasteners; and
   (c) A pivoted wedge between the two said knives connected through linkage to a handle within the body of said aircraft.
4. An aircraft as claimed in claim 2 wherein the pivotal locking means comprises:
   (a) A vertical member secured to the rear of the opening of said aircraft with shearable fastening means, said member having a hole near its top to receive a latch;
   (b) A block sliding vertically along said vertical member; and
   (c) A latch pivotally mounted on said sliding block and having a protrustion capable of engaging said hole at the top of said vertical member.
5. An aircraft as claimed in claim 4 wherein a window within said door is raised and lowered by said sliding block through a spring linkage, said spring linkage comprising:
   (a) a pair of spaced rollers connected to the bottom of said window within said aircraft;
   (b) A leaf spring having one end secured to said sliding block and having its opposite end slidable between the two said rollers at the bottom of said window frame, said leaf spring having its end extending beyond said rollers;
   (c) A rotatable gear mounted within said door and operated by another gear connected to a hand crank and meshing with said rotatable gear; and
   (d) A leaf spring fixed to said rotatable gear which coacts with the automatic window lowering leaf spring.

References Cited by the Examiner
UNITED STATES PATENTS

| 2,378,856 | 6/45 | Laddon et al. | 244—129 |
| 2,622,919 | 12/52 | Scott | 296—44.03 |
| 2,658,792 | 11/53 | Scott | 296—47.1 |
| 3,050,790 | 8/62 | Wakefield | 244—129 |

FOREIGN PATENTS

| 543,034 | 2/42 | Great Britain. |

FERGUS S. MIDDLETON, *Primary Examiner.*